(12) United States Patent
Specht

(10) Patent No.: US 10,399,784 B2
(45) Date of Patent: Sep. 3, 2019

(54) CONVEYING SYSTEM

(71) Applicant: AVANCON SA, Riazzino (CH)

(72) Inventor: Dieter Specht, Arcegno (CH)

(73) Assignee: AVANCON SA, Riazzino (CH)

(*) Notice: Subject to any disclaimer, the term of this patent is extended or adjusted under 35 U.S.C. 154(b) by 0 days.

(21) Appl. No.: 15/763,335

(22) PCT Filed: Oct. 29, 2016

(86) PCT No.: PCT/IB2016/056543
§ 371 (c)(1),
(2) Date: Mar. 26, 2018

(87) PCT Pub. No.: WO2017/072736
PCT Pub. Date: May 4, 2017

(65) Prior Publication Data
US 2018/0282070 A1 Oct. 4, 2018

(30) Foreign Application Priority Data

Oct. 30, 2015 (IT) .......................... 102015000067520

(51) Int. Cl.
B65G 21/00 (2006.01)
B65G 21/02 (2006.01)
(Continued)

(52) U.S. Cl.
CPC ............ B65G 21/02 (2013.01); B65G 13/07 (2013.01); B65G 21/00 (2013.01); B65G 23/00 (2013.01);
(Continued)

(58) Field of Classification Search
None
See application file for complete search history.

(56) References Cited

U.S. PATENT DOCUMENTS 5,940,288 A 8/1999 Kociecki
6,883,660 B2 * 4/2005 Bigelow ................ B65G 13/02
198/781.06
(Continued)

OTHER PUBLICATIONS

International Search Report and written opinion dated Feb. 7, 2017 for PCT/IB2016/056543.
(Continued)

Primary Examiner — Kavel Singh
(74) Attorney, Agent, or Firm — Silvia Salvadori

(57) ABSTRACT

A conveying system (100) is described, comprising:
  two axially spaced supporting frames (2, 3) extending substantially in parallel along the feed direction (F) of the conveying system (100);
  at least one plurality of driving elements (12) supported by said supporting frames (2, 3);
  at least one motor (9) for driving at least one portion of said plurality of driving elements (12);
  at least one transmission assembly for transferring the motion from said motor (9) to said at least one portion of the plurality of driving elements (12);
  a control system for controlling the driving of said plurality of driving elements (12);
  a power supply system for electrically supplying said control system and said at least one motor (9);
  said power supply system comprises at least one power supply board (7) designed to convert the mains voltage into at least one DC voltage;
characterized in that it comprises:
  at least one housing compartment (1) transversely extending between the two supporting frames (2, 3);
  said at least one housing compartment (1) being provided with at least one housing seat for accommodating said at least one power supply board (7) of said power supply system.

12 Claims, 5 Drawing Sheets

(51) Int. Cl.
*B65G 13/06* (2006.01)
*B65G 13/07* (2006.01)
*B65G 23/00* (2006.01)
*B65G 23/08* (2006.01)
*B65G 47/26* (2006.01)
*B65G 43/08* (2006.01)

(52) U.S. Cl.
CPC ........... *B65G 23/08* (2013.01); *B65G 47/268* (2013.01); *B65G 43/08* (2013.01); *B65G 2203/042* (2013.01)

(56) References Cited

U.S. PATENT DOCUMENTS

| | | | |
|---|---|---|---|
| 7,147,096 B2 * | 12/2006 | Mueller | B65G 1/023 193/35 R |
| 2004/0200688 A1 * | 10/2004 | Sorgi | B65G 1/023 193/37 |
| 2013/0134017 A1 | 5/2013 | Hall et al. | |

OTHER PUBLICATIONS

International Preliminary Report on Patentability dated May 1, 2018 for PCT/IB2016/056543.

* cited by examiner

CONVEYING SYSTEM

RELATED APPLICATIONS

This application is the US national phase application of international application number PCT/IB2016/056543, filed 29 Oct. 2016, which designates the US and claims priority to Italian application 102015000067520 filed 30 Oct. 2015, the contents of each of which are hereby incorporated by reference as if set forth in their entireties.

FIELD OF THE INVENTION

The present invention concerns the field of conveying systems, i.e. systems for driving objects and/or people along a predetermined path. In particular, the present invention is particularly used in conveying systems, such as belt, roller, skate, wheel, slat, chain etc. conveyors.

KNOWN ART

Conveying systems have been known for over a hundred years and usually comprise a plurality of driving elements arranged so as to define a feed path for example for products, such as boxes, parcels, suitcases, letters, packaging materials or for example for people, such as in case of belt conveyors, escalators, etc. Generally, these systems allow people and/or objects to be driven between an operative station and a subsequent one.

Conveying systems have a very wide variety of application such as for example post offices, airports and various types of manufacturing or logistical industries providing, during the production process or in their activity, the driving of products between several operative stations (assembly lines, production lines, etc.).

For example, conveying systems are typically provided with electric motors in order to drive the driving elements (such as roller and/or wheels). A control system (e.g. of the master/slave type) operates the electric motors and allows the product flow to be managed along the entire line path. The electric motors and the circuits of the control system are supplied by a power supply system comprising one or more power supply boards typically provided with transformers and AC/DC converters, to convert the mains supply voltage to a DC voltage suitable for the type of device to be powered (electric motors, control circuits, etc.).

The power supply system is usually distributed along the path of the conveying systems in substations laterally fastened on the conveyor frame. The power supply boards, for electrically supplying electric motors and control circuits associated with a specific portion of the conveying system, are housed inside the substations.

Power supply boards can generate a lot of heat during operation and, for this reason, typically the substations are made large so as to prevent overheating inside the substation. Furthermore, the substation walls can be provided with ventilation holes in order to facilitate the cooling of the supply circuits.

Depending on the working environment, water droplets can develop on the external walls of the substations, for example due to moisture condensation. The water, passing through the ventilation holes, can get into the substation thereby damaging the power supply boards housed therein.

The Applicant noticed that a major problem in the field is the considerable bulk of substations, which in some circumstances can be a barrier for the products traveling along the line path. For example, if the conveying system comprises path portions extending over several floors (one above the other) and/or extending adjacently one beside the other, the substations have to be arranged one by one so that they are not a barrier for the product transit and so that they can be accessed by an operator for inspecting the supply circuits housed therein. It is not always easy to achieve the best arrangement of the substations. Implementing case by case a dedicated arrangement for the power supply system results in huge loss of time, in terms of man-hour, and in costs.

The Applicant further noticed that the implementation of a control and power supply system dedicated case by case to a specific conveying system may require a very wide warehouse in terms of several types of central units, fastening members and different wire harnesses to the company that manufactures the conveying system.

Therefore, the Applicant found the need to provide a new conveyor, easy to be manufactured, in which the power supply system can be housed and installed through a standard, quick and easy operation.

SUMMARY OF THE INVENTION

Therefore, a first aspect of the invention concerns a conveying system comprising:
  two axially spaced supporting frames extending substantially in parallel along the feed direction of the conveying system;
  at least one plurality of driving means supported by said supporting frames;
  at least one motor for driving at least one portion of said plurality of driving elements;
  at least one transmission assembly to transfer the motion from said motor to said at least one portion of the plurality of driving elements;
  a control system for controlling the driving of said plurality of driving elements;
  a power supply system for electrically supplying said control system and said at least one motor;
  said power supply system comprises at least one power supply board designed to convert the mains voltage into at least one DC voltage;
characterized in that it comprises:
  at least one housing compartment transversely extending between the two supporting frames;
  said at least one housing compartment being provided with at least one housing seat for accommodating said at least one power supply board of said power supply system.

Moreover, in the scope of the present invention, "transverse" and "transversely" mean a direction substantially orthogonal to the feed direction of the conveying system, i.e. the feed direction of goods.

On the other hand, "longitudinal" means a direction substantially parallel to or coincident with the feed direction of the conveying system.

The bulk of the housing of the power supply boards can be optimized by providing at least one housing compartment transversely extending with respect to the two supporting frames, thereby making the entire structure of the conveying system more compact. In addition, thanks to the present invention, the assembling of the conveying system turns out to be a standard operation for any type of feed path. The housing compartment is positioned so that it is not a barrier for goods traveling along the feed direction.

In the above said aspect, the present invention can have at least one of the preferred characteristics hereinafter described.

Preferably, said at least one motor is a DC electric motor.

Alternatively, said at least one electric motor is a DC electric motor.

Advantageously, the motor is arranged externally to said at least one housing compartment.

Preferably, the control system for controlling the driving of said plurality of driving means is arranged externally to said at least one housing compartment.

Advantageously, there are fastening means for constraining said at least one housing compartment between the two supporting frames. Conveniently, the fastening means comprise self-threading screws.

Advantageously, said at least one housing compartment has a substantially tubular shape with quadrangular section comprising a removable wall. This aspect is particularly advantageous when wiring and positioning the power supply board and/or power supply cables inside the housing compartment.

Conveniently, said housing is designed to accommodate said power supply board perpendicularly with respect to said removable wall.

Thanks to this aspect, the housing compartment allows to simplify the inspection and/or removal of the power supply board, for example for a replacement thereof.

Advantageously, said housing compartment comprises means for dissipating heat.

Preferably, said housing compartment is made of aluminum.

Preferably, said housing compartment is made of steel.

Conveniently, said housing compartment is made by extrusion.

Preferably, the housing compartment comprises a cavity for housing, at least partially, said at least one power supply board configured for converting the mains voltage in at least one DC voltage.

Thanks to these aspects, it is possible to reliably make a housing which is light, resistant and able to effectively dissipate the heat generated by the power supply board housed therein.

BRIEF DESCRIPTION OF THE DRAWINGS

Further characteristics and advantages of the invention will become more apparent from the detailed description of some preferred, but not exclusive, embodiments of a new conveying system according to the present invention.

This description will be explained hereinafter by referring to the attached drawings provided for illustration purposes only and without limitation, in which.

DETAILED DESCRIPTION OF EMBODIMENTS OF THE INVENTION

Figure 1:
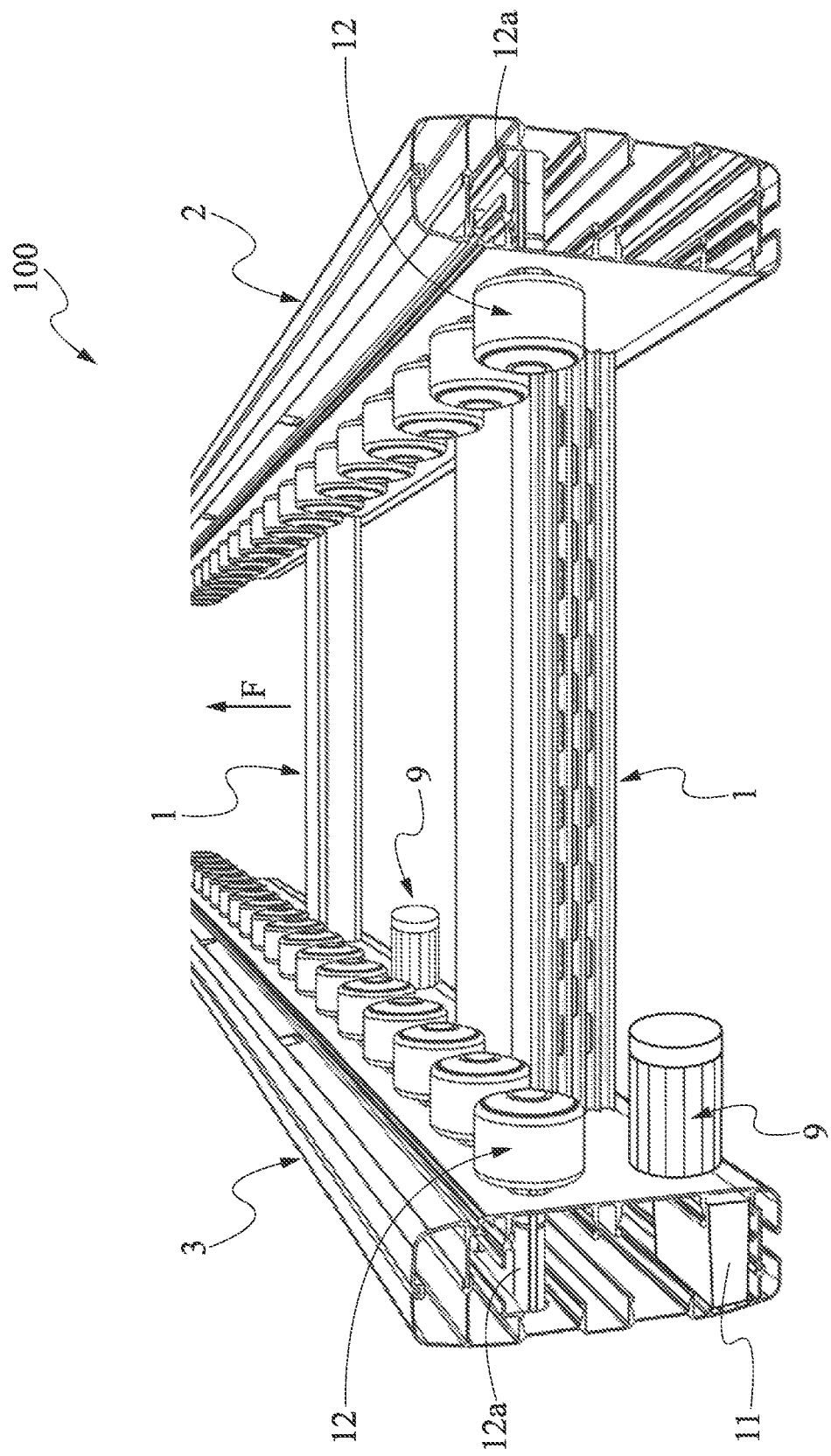
FIG. 1 is a schematic perspective front view of a conveying system according to a particular embodiment of the present invention.
Figure 2:
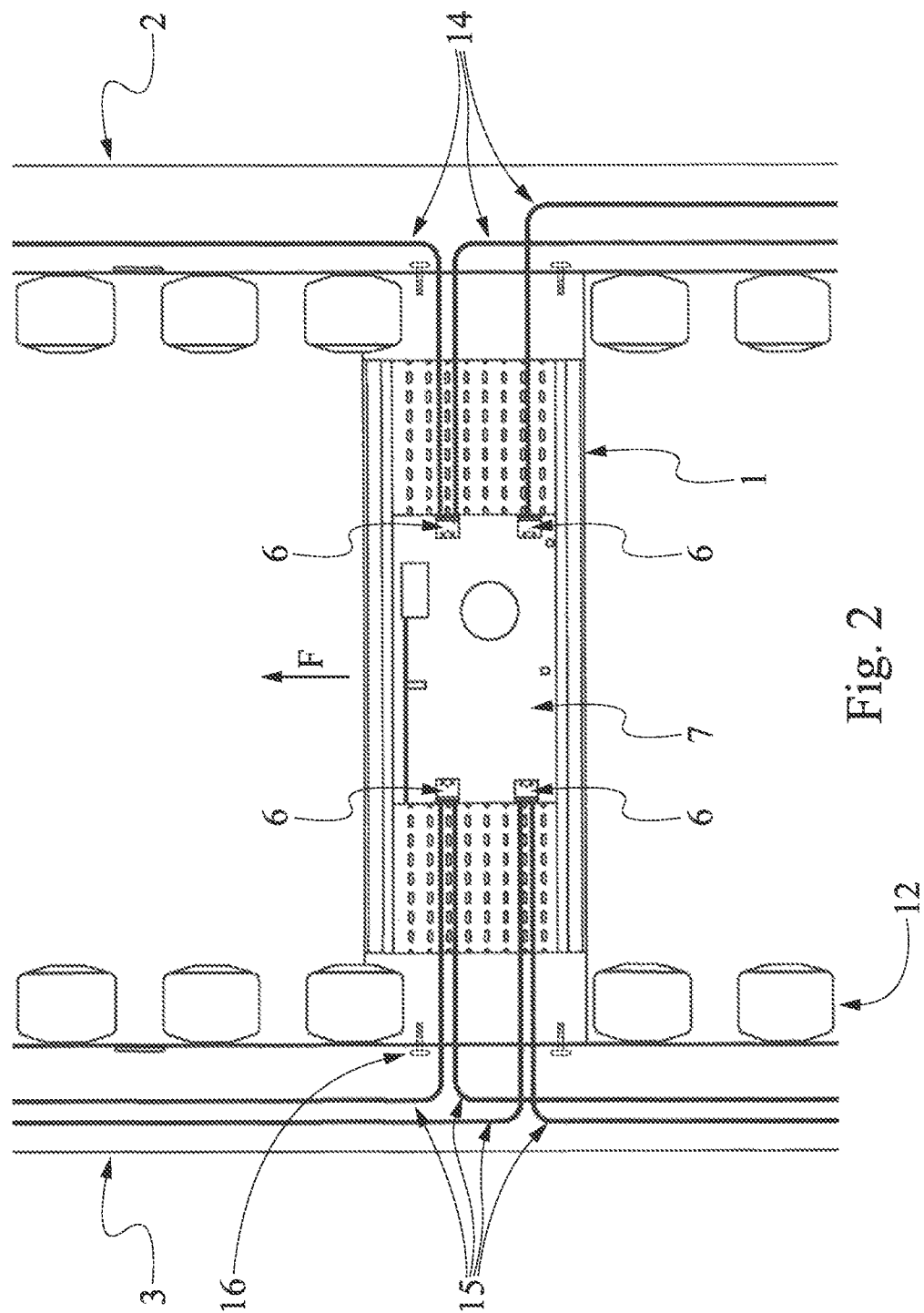
FIG. 2 is a schematic plan view of a conveying system according to a particular embodiment of the present invention.

Referring to FIGS. 1 and 2, a conveying system is depicted by the numerical reference 100. Although for simplicity in explanation, reference will be made hereinafter to a specific conveying system 100, the present invention can apply to any conveying system, that is to say to a general system for driving objects and/or people along a predetermined path, such as a conveying system, a production line, an assembling line, a conveyor belt, an escalator, etc.

Referring to FIG. 1, the conveying system 100 has two axially spaced supporting frames 2, 3 extending substantially in parallel along the feed direction F of the conveyor 100. The feed direction depicted in figures by the arrow F, indicates the extension direction of the conveyor 100.

The supporting frames 2, 3 preferably have a tubular shape, for example obtained by coupling two half-shells having a C or L section. Advantageously, the supporting frames 2, 3 are made of extruded materials, such as extruded aluminum or, alternatively, reinforced extruded plastic materials.

The conveying system 100 further comprises at least one plurality of driving elements 12 supported by the two supporting frames 2, 3 and at least one motor 9 for driving at least one portion of said plurality of driving elements. Preferably, the motor 9 is a DC motor 9. Preferably, for each supporting frame 2, 3 there are a plurality of driving elements 12 extending side by side, substantially along the whole extent of the conveying system 100.

In the embodiment shown in FIG. 1, the driving elements 12 comprise at least one plurality of wheels rotatably constrained to the supporting frames 2, 3 by means of supporting shafts 12a.

In particular, the conveying system 100 includes at least one transmission assembly to transfer the motion from the motor 9 to at least one plurality of driving elements 12. In detail, each supporting shaft 12a is rotatably constrained to the supporting frame 2 or 3 by means of at least one bearing. The supporting shafts are driven by drive belts or chains (not shown in figures), preferably housed inside the frames 2, 3, which constitute the transmission assembly to transfer the motion from the motor 9 to the wheels 12, that is to say to transfer the motion of the drive shaft to at least one supporting shaft 12a.

In particular, in the embodiment of FIG. 1, the drive shaft of the motor 9 is fitted inside the supporting frame 3 and the motor 9 is constrained to the supporting frame 3 from the outside. In further embodiments the motor 9 can be entirely housed inside the supporting frame 2 or 3, though still falling within the protection scope of the present invention.

Further embodiments can provide for driving elements 12 different from the wheels shown in FIG. 1, such as roller, belts, etc., though still falling within the protection scope of the present invention. By driving the wheels 12, or in general the driving means 12, it is possible to displace for example goods or products along the feed direction F of the conveyor 100.

The conveying system 100 is provided with a control system to control the driving of the driving elements 12. Preferably, the control system comprises at least one control unit 11 housed, for example, inside the supporting frames 2, 3, and at least one sensor (not shown) for detecting bodies that is arranged along the feed path of the conveyor 100. In particular, the control unit 11 operates one or more motors 9 depending on the signal received from the sensors for detecting bodies, in order to ensure that the goods or products smoothly circulate along the feed direction.

For example, the control system can drive one or more motors 9 for driving the driving elements 12 associated with a path portion in which an object to be fed is detected. In other words, if no product to be fed is detected in a path portion, the driving elements 12 are not driven until an object, for example approaching and coming from a path portion upstream of the feed direction F, is detected.

The control system can be, for example, of the master-slave type, i.e. provided with master control units and slave control units. The control system is located in one of the two supporting frames 2,3.

Preferably, the slave control units are connected to each other and, in turn, each of them is connected to a master control unit through an AS-interface data exchange cable allowing to exchange information and coordinate the slave control units. Therefore, said at least one AS-interface data exchange cable mainly runs inside one of the two supporting frames 2,3.

Therefore, the conveying system 100 can be split into macro working areas each defined by a master control unit and multiple slave control units, each of the latter being associated with a motor 9 and with at least one sensor for detecting bodies.

The master control unit processes the command to be submitted to the slave control units depending on the signal coming from the sensor for detecting bodies of each secondary zone. Preferably, each secondary zone is individually controlled, so that the fed goods or products can not ever touch one another. The driving elements 12 of a zone are not driven until the subsequent zone (i.e. downstream along the feed direction F) is empty.

The conveying system 100 is further provided with a power supply system to electrically supply the control system and the motor 9. In particular, the power supply system comprises at least one power supply board 7 designed to convert the mains voltage.

In particular, the power supply system comprises at least one power supply board 7 designed to convert the mains (alternating) voltage into at least one DC voltage.

The conveying system 100 comprises at least one housing compartment 1 transversely extending between the two supporting frames 2, 3. In particular, the housing compartment 1 extends from a supporting frame 2 to the remaining supporting frame 3. The housing compartment 1 is provided with at least one housing seat in order to accommodate one or more power supply boards 7 of the power supply system.

This solution allows the power supply boards to be standardly housed without requiring each time an assessment in order to position and arrange the substations along the feed path.

In the embodiment shown in FIG. 1, two housing compartments 1 can be seen, but further embodiments may provide a greater number of housing compartments 1. For example, an embodiment may provide for the conveying system 100 to be equipped with a plurality of housing compartments 1, which are preferably arranged along the feed direction and spaced from one another by a determined distance.

Each housing compartment 1 is preferably provided with a housing seat in order to accommodate a power supply board 7. Anyway, additional embodiments may provide, for example, for a conveying system comprising a single housing compartment 1 equipped with a plurality of housing seats in order to accommodate therein a respective plurality of power supply boards.

In other words, all the power supply boards of the power supply system are accommodated within one or more housing compartments 1. In general, the conveying system 100 comprises a power supply system provided with at least one power supply board, and at least one housing compartment 1 provided with at least one housing seat in order to accommodate said at least one power supply board 7.

The special arrangement of the housing compartments allows to reduce the size of the conveying system. In particular, by transversely arranging one or more housing compartments 1 between the two supporting frames of the conveying system, the travel of goods along the feed direction is not blocked. In this way, conveying systems can be implemented in which portions of the feed path can extend over several floors (one above the other) and/or adjacent one beside the other, without previously requiring an assessment of the arrangement and housing of the power supply boards depending on the feed path.

The housing compartment 1 thus contains only the power supply board 7 and does not contains either the motor 9, or the motor shaft, or the control system to control the driving of the plurality of driving means 12.

The motor 9 and the control system to control the driving of the plurality of driving means 12 are in fact arranged externally of the housing compartment 1.

FIG. 2 schematically shows an embodiment of the conveying system 100 comprising a power supply board 7 housed inside the housing compartment 1. The power supply board 7 comprises for example transformers, AC/DC converter or similar means for converting the mains voltage (for example equal to 110V-140V AC or 200V-400V AC) into at least one DC voltage. The mains voltage is input to the power supply board through power supply cables 14 connected to the power supply board 7 by means of connecting plugs 6. Preferably, the power supply board is designed to convert the input AC voltage into two DC voltages. For example, the power supply board can be designed to output a first supply voltage of about 48V DC (for example for supplying the electric motors 9) and a second supply voltage of about 30V DC (for example for supplying the control units 11 of the control system). The DC voltages are given to the electric motors 9 and the control units 11 by means of power supply cables 15 connected to the output of the power supply board 7 by means of additional connecting plugs 6. Preferably, the power supply cables 15 are cables of AS-interface type.

The housing compartment 1 preferably has a substantially tubular shape with quadrangular section. This shape allows the power supply cables 14, 15 to be easily passed through the inside of the housing compartment and connected to power supply board 7. In particular, the power supply cables 14 of the mains voltage are housed inside the supporting frame 2 and, by means of one or more transverse passages (not shown in figure) made on the supporting frame 2, the power supply cables 14 are passed between the supporting frame 2 and the housing compartment 1. Similarly, the power supply cables 15 of the DC voltage are preferably housed inside the supporting frame 3, i.e. the supporting frame in which the electric motors 9 and the control units 11 are located. Therefore, by means of transverse passages formed on the supporting frame 3, the power supply cables 15 are passed between the housing compartment 1 and the supporting frame 3.

The housing compartment 1 is transversely constrained between the two supporting frames 2, 3 by fastening means 16. The fastening means 16 preferably comprise screws adapted to be received in apposite seats formed in the housing compartment 1. For example, the housing compartment can be quickly constrained by means of self-threading screws preferably screwed from the inside of the supporting frames 2, 3. The housing compartment helps to give strength to the structure of the conveying system further providing a convenient housing for the power supply boards of the power supply system.

Referring to FIGS. 3-5, the housing compartment 1 has a substantially tubular shape with quadrangular section comprising a removable wall. In particular, the housing compartment comprises a lower wall 8, an upper wall 11 and two side walls 1a, 1b. Preferably, the removable wall 8 is the lower wall of the housing compartment 1, i.e. the wall facing the floor of the environment in which the conveying system 100 is installed.

The removable wall 8 allows an operator to easily house the power supply board and the power supply cables 14, 15 inside the housing compartment 1 even after the housing compartment 1 has been fastened between the two supporting frames 2, 3.

Figure 3A:
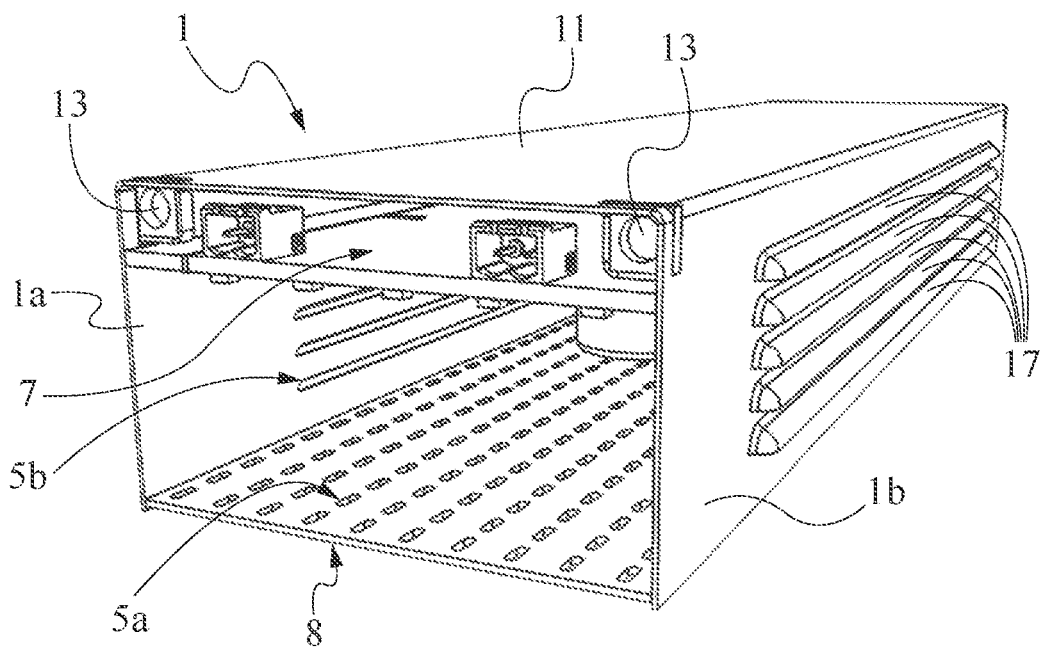
FIGS. 3A, 4A are respectively a schematic angular perspective view and a schematic exploded view of a housing compartment according to a first embodiment of the conveying system according to the present invention.
Figure 3B:
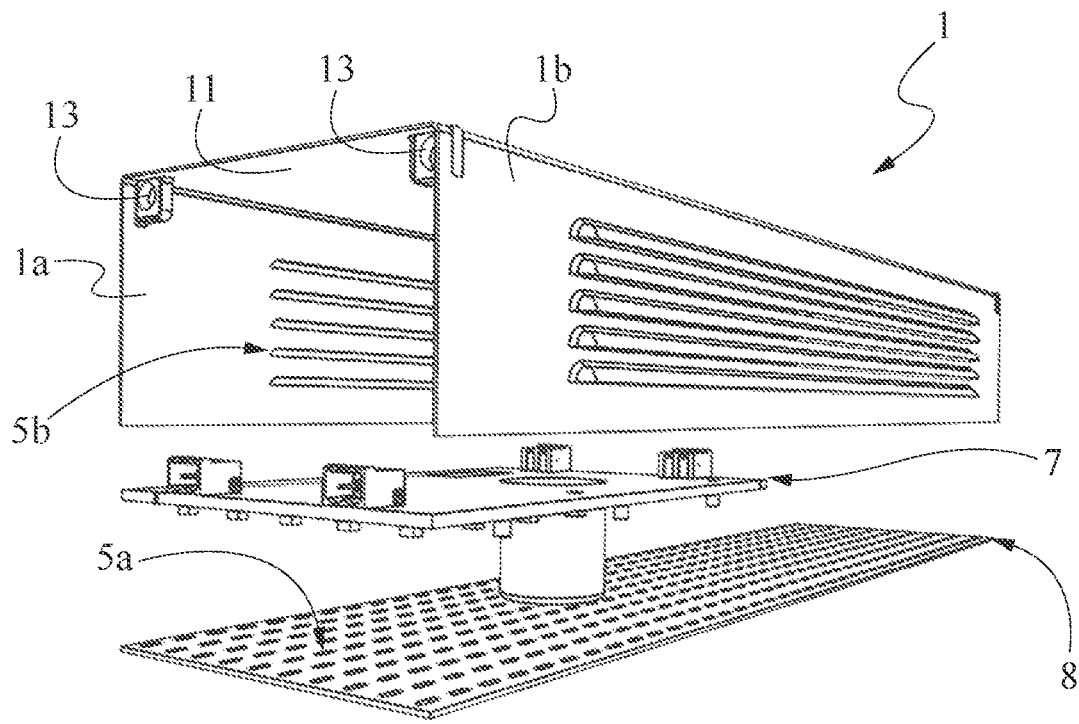
FIGS. 3B and 4B are respectively a schematic angular perspective view and a schematic exploded view of a housing compartment according to a second embodiment of the conveying system according to the present invention.

In FIGS. 3A and 3B a first embodiment of the housing compartment 1 is shown. In this embodiment, the housing compartment is made of steel, for example by bending a steel plate or otherwise by extrusion. The housing compartment 1 is provided with seats 13 adapted to accommodate the fastening screws 16 in order to constrain the housing compartment 1 between the two supporting frames 2 and 3.

The housing compartment 1 further comprises heat dissipating means. Preferably, the heat dissipating means comprise a plurality of ventilation holes 5a formed on the removable wall 8. Preferably, the heat dissipating means further comprise a plurality of slots 5b formed on at least one side wall 1a, 1b of the housing compartment 1.

In the embodiment of FIGS. 3A and 3B, the slots 5b are preferably made on both the side walls 1a, 1b of the housing compartment 1. Preferably, each slot 5b extends along a direction parallel to the extension direction of the housing compartment 1. In this embodiment the side walls 1a, 1b of the housing compartment 1 are further provided with covering elements 17 arranged above the slots 5b. The covering elements 17 preferably have a substantially downward-curved or inclined lamellar shape. The covering elements 17 guide any water droplets possibly formed on the outer walls of the housing compartment 1 to the outside of the housing compartment 1. In this way, air can pass through the slots 5b and at the same time any water droplets being on the outer walls of the housing compartment 1 is prevented from entering the housing compartment 1.

Figure 4A:
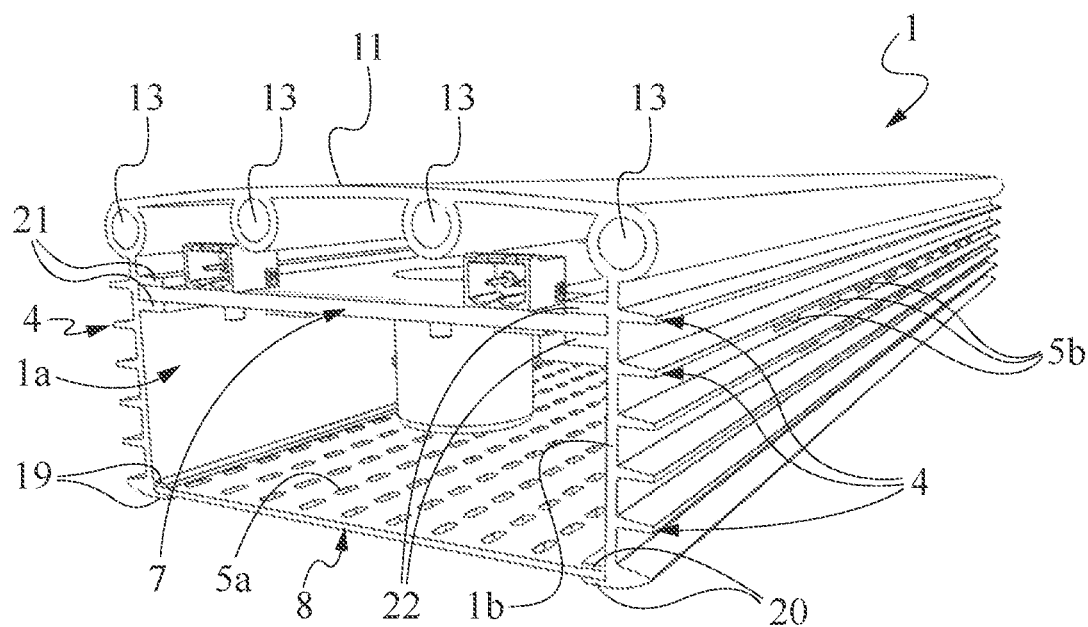
Figure 4B:
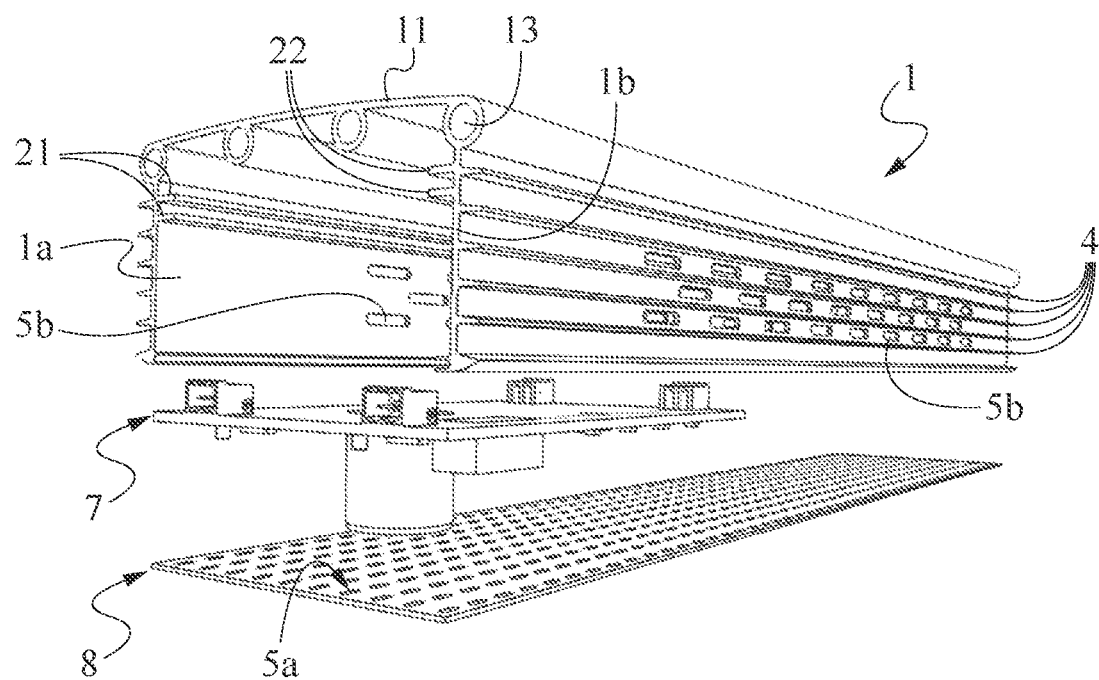

In FIGS. 4A and 4B a second embodiment of the housing compartment 1 is shown. In this embodiment, the housing compartment 1 is preferably made of aluminum, more preferably by extrusion. Preferably, the seats 13 of the fastening means have a substantially tubular shape extending along the entire length of the housing compartment 1.

On the inner surface of the side walls 1a, 1b of the housing compartment 1, there are ribs 21, 22 defining a housing seat in which the power supply board 7 can be constrained. The housing compartment 1 comprises additional ribs 19, 20 made on the side walls 1a, 1b of the housing compartment 1 and arranged at the removable wall 8. By means of the ribs 19, 20 the removable wall 8 can be constrained between the side walls 1a, 1b of the housing compartment 1.

Referring to FIGS. 4A, 4B the heat dissipating means further comprise at least one cooling fin 4 jutting outward from the housing compartment 1.

Preferably, the housing compartment is provided with a plurality of cooling fins 4 arranged on at least one side wall 1a, 1b of the housing compartment 1. In the embodiment of FIGS. 4A and 4B, the cooling fins 4 are arranged on both the side walls 1a, 1b of the housing compartment 1. The cooling fins are preferably made by extrusion together with the housing compartment 1. The heat generated by the power supply board 7 housed inside the housing compartment 1 can be effectively dissipated to the outer environment by the cooling fins. Preferably, each cooling fin 4 extends along a direction substantially parallel to the extension direction of the housing compartment 1.

Preferably, the cooling fins are arranged above the slots 5b. In this way, the cooling fins 4 not only dissipate heat from the inside of the housing compartment 1 but also can prevent the water droplets from passing through the slots 5b. Preferably, the cooling fins 4 are slightly inclined downwards so as to guide downwards any water droplets being on the outer walls of the housing 1.

Figure 5A:
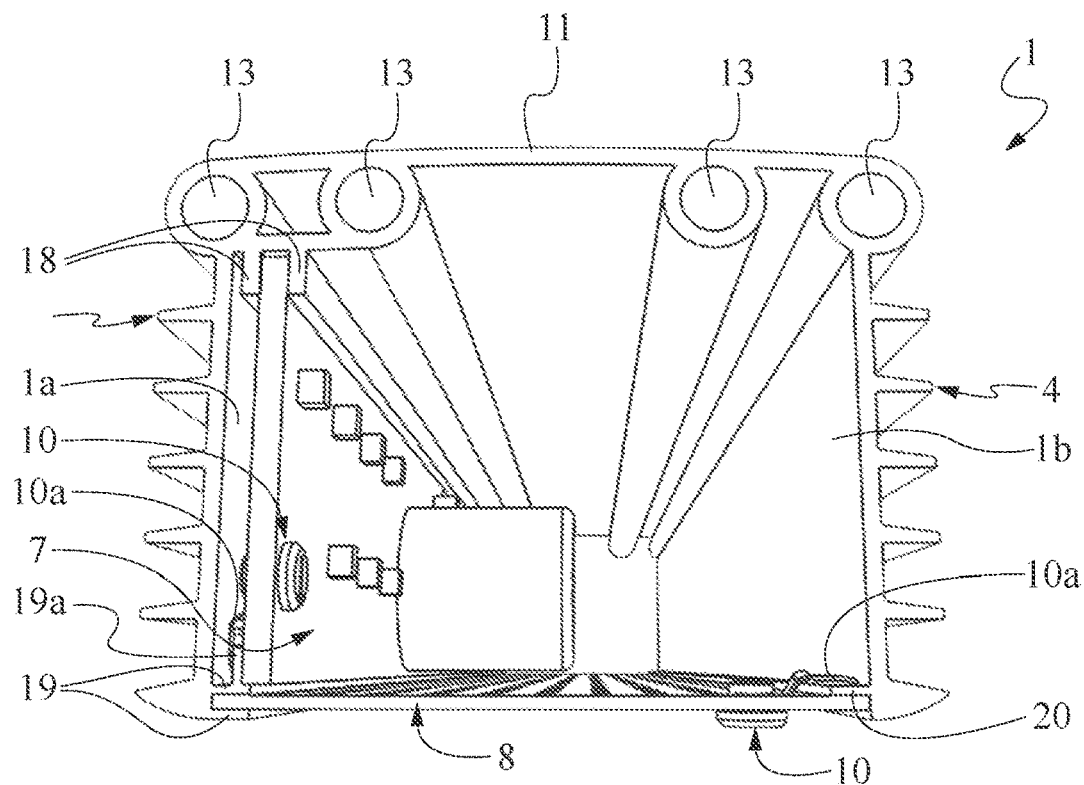
FIGS. 5A and 5B are schematic front and angular perspective views, respectively, of a housing compartment according to a third embodiment of the conveying system according to the present invention.
Figure 5B:
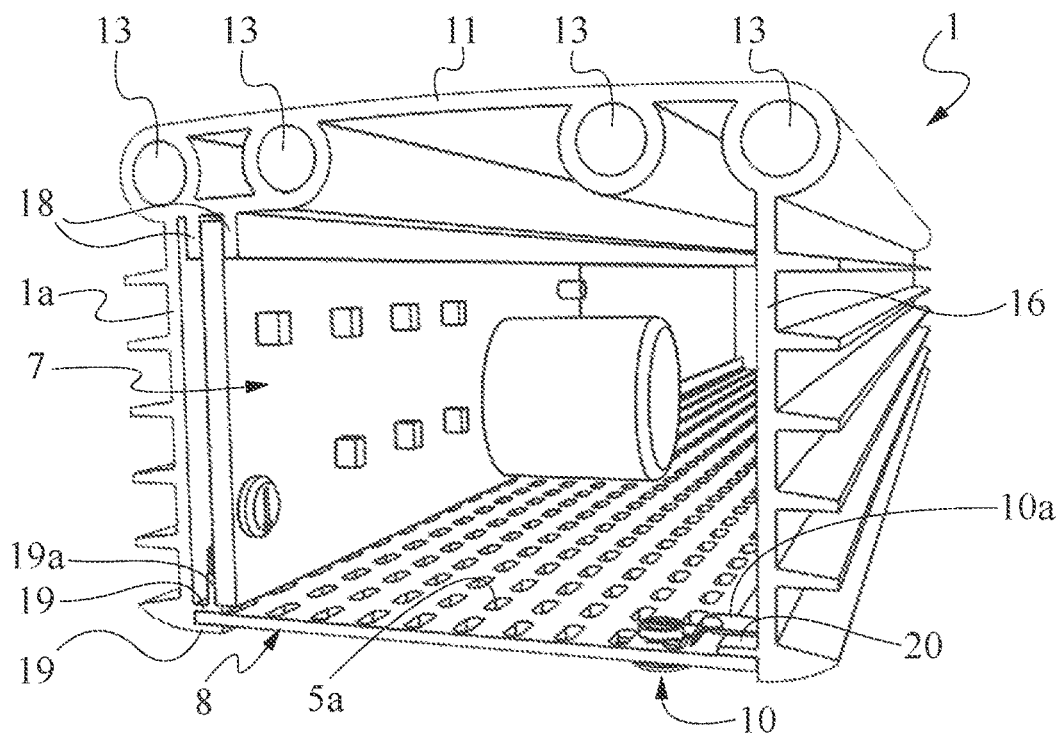

In FIGS. 5A and 5B a third embodiment of the housing compartment 1 is shown. Referring to FIGS. 5A and 5B, the housing compartment 1 comprises a housing seat designed to accommodate the power supply board perpendicularly to the removable wall 8. This embodiment is particularly advantageous for inspecting and in case replacing the power supply board 7.

In particular, the power supply board 7 is preferably housed at a side wall 1a of the housing compartment 1, preferably parallel thereto. Inside the upper wall 11 of the housing compartment 1 there are two ribs 18 arranged parallel to the extension direction of the housing compartment 1. One side of the power supply board can be advantageously inserted between the two ribs 18, the opposite side of the power supply board 7 is supported by a further rib 19 made on the side wall 1a of the housing compartment 1. Such rib 19 extends perpendicularly to the side wall 1a and is arranged at the removable wall 8. Preferably, the rib 19 can have a T-shape, with a portion 19a jutting towards the upper wall 11. The power supply board 7 can comprise rotatable hooking means 10 comprising a hook 10a movable between an open position and a closed position. In FIGS. 5A and 5B, the rotatable hooking means 10 are shown in the closed position. In this configuration, the hook 10a engages the rib portion 19a thereby keeping the power supply board 7 perpendicular to the removable wall 8. By rotating the hook 10a towards the open position (for example rotating by 90° with respect to the closed position), the power supply board 7 can be tilted and then extracted from the housing compartment 1.

Similarly, also the removable wall 8 can be provided with rotatable hooking means 10. In the embodiment of FIGS. 5A and 5B, the side wall 1a is provided with two parallel ribs 19. One side of the removable wall is inserted between the ribs 19, the opposite side is constrained to the side wall 1b by rotatable hooking means 10. In particular, the side wall 1b is provided with a rib 20 for supporting the hook 10a of the rotatable hooking means 10 in the closed position. Similarly to what above described, by rotating the hook 10a towards the open position, the bottom wall can be extracted from the ribs 19 thereby making the inside of the housing compartment 1 easy to be accessed from the outside, for example for the inspection or the replacement of the power supply board 7.

As already previously described, the housing compartment 1 is advantageously manufactured by extrusion so as to have, in a single process, all the elements of the profile comprising the two side walls, the upper wall, the seats 13 for housing the screws 16, one or more cooling fins 4 and the inner ribs 18, 19, 20 to accommodate the power supply board 7 and the removable wall 8.

The present invention has been described referring to some embodiments. To the embodiments herein represented in detail various modifications can be made, anyway remaining in the protection scope of the invention, defined by the following claims.

The invention claimed is:

1. A conveying system (100) comprising:
    two axially spaced supporting frames (2, 3) extending substantially in parallel along a feed direction (F) of the conveying system (100);
    at least one plurality of driving elements (12) supported by said supporting frames (2, 3);
    at least one motor (9) for driving at least one portion of said plurality of driving elements (12);
    at least one transmission assembly for transferring motion from said motor (9) to said at least one portion of the plurality of driving elements (12);
    a control system for controlling the driving of said plurality of driving elements (12);
    a power supply system for electrically supplying said control system and said at least one motor (9);
    said power supply system comprising at least one power supply board adapted to convert a mains voltage into at least one DC voltage; and
    at least one housing compartment (1) transversely extending between the two supporting frames (2, 3), from first said supporting frame (2) to the second said supporting frame (3),
    said at least one housing compartment (1) including at least one housing seat for accommodating said at least one power supply board (7) of said power supply system.

2. The conveying system (100) according to claim 1, wherein said at least one motor (9) is disposed external to said at least one housing compartment (1).

3. The conveying system (100) according to claim 1, wherein said control system (12) is disposed external to said at least one housing compartment (1).

4. The conveying system (100) according to claim 1, wherein said at least one housing compartment comprises a cavity for housing, at least partially, said at least one power supply board (7) configured for converting the mains voltage in at least one DC voltage.

5. The conveying system (100) according to claim 1, further comprising fastening means (13, 16) for constraining said at least one housing compartment (1) between the two supporting frames (2, 3).

6. The conveying system (100) according to claim 5, wherein said fastening means comprise self-threading screws (16).

7. The conveying system (100) according to claim 1, wherein said at least one housing compartment (1) has a substantially tubular shape with quadrangular section comprising a removable wall (8).

8. The conveying system (100) according to claim 7, wherein said housing seat is adapted to accommodate said power supply board (7) perpendicularly to said removable wall (8).

9. The conveying system (100) according to claim 1, wherein said housing compartment (1) includes means (4, 5a, 5b) for dissipating heat.

10. The conveying system (100) according to claim 1, wherein said housing compartment (1) is formed of aluminum.

11. The conveying system (100) according to claim 1, wherein said housing compartment (1) is formed of steel.

12. The conveying system (100) according to claim 1, wherein said housing compartment (1) is made by extrusion.

\* \* \* \* \*